US012644831B2

(12) United States Patent
Fathi et al.

(10) Patent No.: US 12,644,831 B2
(45) Date of Patent: Jun. 2, 2026

(54) COMPACT INJECTION MOLDED OPTICAL MODULE FOR GAS SENSING

(71) Applicant: Renesas Electronics America Inc., Milpitas, CA (US)

(72) Inventors: Mohammad Taghi Fathi, Dresden (DE); Thomas Reichel, Dresden (DE)

(73) Assignee: Renesas Electronics America Inc., Milpitas, CA (US)

( * ) Notice: Subject to any disclaimer, the term of this patent is extended or adjusted under 35 U.S.C. 154(b) by 133 days.

(21) Appl. No.: 18/398,349

(22) Filed: Dec. 28, 2023

(65) Prior Publication Data

US 2025/0216327 A1     Jul. 3, 2025

(51) Int. Cl.
G01N 21/3504 (2014.01)
(52) U.S. Cl.
CPC . G01N 21/3504 (2013.01); *G01N 2201/0228* (2013.01); *G01N 2201/0636* (2013.01)
(58) Field of Classification Search
CPC ....... G01N 21/3504; G01N 2201/0228; G01N 2201/0636
See application file for complete search history.

(56) References Cited

U.S. PATENT DOCUMENTS

2014/0070101 A1 *  3/2014  Matsushima .......... G01N 21/17
250/338.5

* cited by examiner

*Primary Examiner* — Jamil Ahmed
(74) *Attorney, Agent, or Firm* — SCULLY, SCOTT, MURPHY & PRESSER, P.C.

(57) ABSTRACT

An optical module component for a gas sensor may comprise a first housing portion and a second housing portion. The first housing portion and the second housing portion may be configured to be joined together and to form a substantially cylindrical optical cavity when joined together. The optical module component may further comprise: a first opening for receiving light from a light source; at least one second opening for passing light from the optical cavity to a detector; a first curved reflecting element configured to direct the light from the light source into the optical cavity; and a second curved reflecting element configured to direct the light from the optical cavity to the detector. In particular, optical axes of the first and second curved reflecting elements may be tilted with respect to a diametral plane of the optical cavity.

18 Claims, 12 Drawing Sheets

100

100

500

S510 providing first housing portion of optical module component

S520 providing second housing portion of optical module component

S530 providing reflective coating layer on surface of first housing portion of optical module component S540 providing reflective coating layer on surface of second housing portion of optical module component S550 placing optical filter in second opening, which is located above detector, within first housing portion S560 joining first housing portion to second housing portion

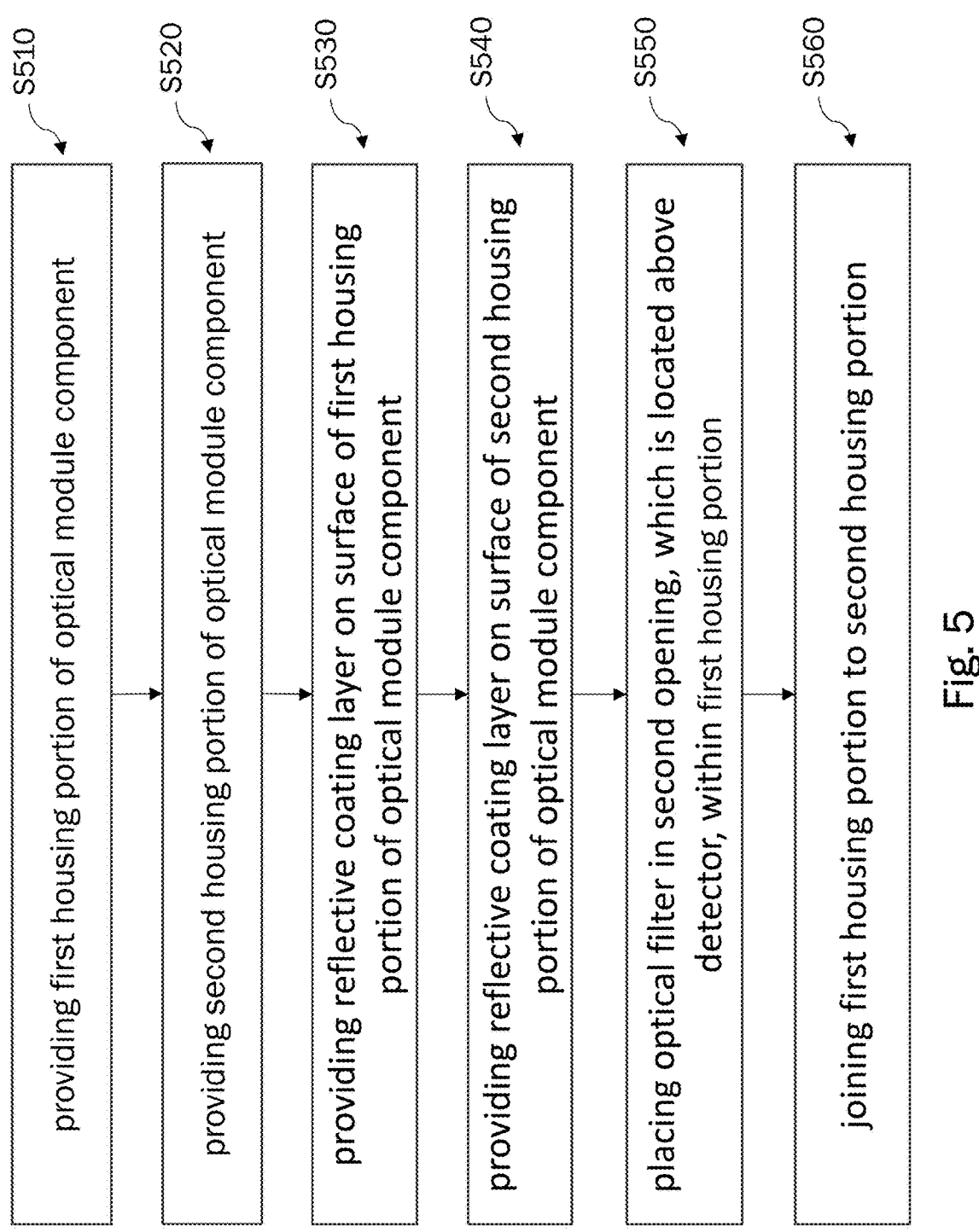

Fig. 5

COMPACT INJECTION MOLDED OPTICAL MODULE FOR GAS SENSING

TECHNICAL FIELD

The present disclosure is generally directed to gas sensor modules, for example using nondispersive infrared (NDIR) sensing techniques, and more particularly to NDIR gas sensors having a compact optical cavity structure for gas detection.

BACKGROUND

NDIR gas sensors are widely used for detecting the presence and concentration of various gases. Instead of using a dispersive element such as a prism or diffraction grating to separate out broadband light into a narrow spectrum suitable for gas sensing, NDIR sensors employ a broadband lamp source and an optical filter to select a narrow band spectral region that overlaps with the absorption region of the gas of interest. In general, NDIR sensors are operated in the infrared (IR) range between 780 nm and 1 mm of wavelengths, where the IR light from the broadband lamp source is directed through a sample chamber towards an IR detector of the NDIR sensors. In the meantime, the NDIR sensors are provided with the gas of interest in the sample chamber, which causes absorption of particular wavelengths of the IR light. Accordingly, gas presence and concentration can be determined by measuring the attenuation of the absorbed wavelength(s) using the detector. The wavelength that the gas of interest can be selected via an optical filter placed in front of the IR detector.

In this way, NDIR sensors provide high sensitivity and stability for gas measurement and detection. On the other hand, conventional NDIR gas sensors require costly IR optics and components such as filters and detectors in order to achieve precise measurement. Besides, conventional NDIR gas sensors commonly have large chamber size in order to achieve better gas absorption. Hence, the applications of NDIR gas sensors become limited because of their complexity and high cost of implementation. It has also been long the challenge to manufacture NDIR gas sensors with small and compact size.

Therefore, inexpensive and compact NDIR gas sensor. Accordingly, the focus of the present disclosure is to propose techniques and/or mechanisms for improvement in design and/or manufacturing of NDIR gas sensors, and more particularly, in a compact and cost-efficient manner.

SUMMARY

In view of some or all of the above technical problems, the present disclosure generally provides a compact injection molded optical module for gas sensing, and in particular, an optical module component for a gas sensor, and a gas sensor, having the features of the respective independent claims.

According to an aspect of the disclosure, there is provided an optical module component for a gas sensor. The optical module component may comprise a first housing portion and a second housing portion. The first housing portion and the second housing portion may be configured to be joined together and to form a substantially cylindrical optical cavity when joined together. In particular, a lower inner surface of the optical cavity may be formed by the first housing portion and an upper inner surface of the optical cavity may be formed by the second housing portion. Besides, the optical module component may further comprise a first opening for receiving light from a light source, and at least one second opening for passing light from the optical cavity to a detector. In addition, the optical module component may also comprise a first curved reflecting element configured to direct the light from the light source into the optical cavity, and a second curved reflecting element configured to direct the light from the optical cavity to the detector. Specifically, optical axes of the first and second curved reflecting elements may be tilted with respect to a diametral plane of the optical cavity.

It should be noted that the positions of the first and second openings, and the positions of the first and second curved reflective elements relative to the first and second housing portions may be determined according to a wide variety of implementations. For example, the first and second openings may be formed in the first housing portion. For example, the first and second curved reflective elements may be formed in either of the first and second housing portions.

Configured as above, the optical molding structure according to the present disclosure provides an efficient way to improve the coupling efficiency of the light source into the optical cavity to maximize the light absorption of the gas, while keeping the light source relatively far away from the main body of the optical cavity. For this purpose, a configuration of a miniaturized optical cone reflector and a curved reflection mirror may be connected and placed at a very close distance above the light source to reduce the divergence angle of the light beam and guide the light more efficiently into the optical cavity.

In some embodiments, the optical module component may further comprise a guiding reflector for coupling the light from the light source into the optical cavity. The guiding reflector may have a specific optimum shape for guiding the light to the optical cavity. For example, the guiding reflector may have a truncated cone shape. In particular, the guiding reflector may be arranged such that a smaller diameter part of the cone shape points towards the light source. In some embodiments, the first housing portion may comprise a flat surface and the guiding reflector for coupling the light from the light source into the optical cavity. Furthermore, the second housing portion may comprise a cylindrical structure and the first and second curved reflecting element. In particular, the flat surface of the first housing portion may be positioned to be joined to a peripheral wall of the cylindrical structure of the second housing portion. Also, the first opening and the second opening may be disposed at the flat surface of the first housing portion. Alternatively, the first housing portion may comprise a cylindrical structure and the second housing portion may comprise a flat surface. In this case, the flat surface of the second housing portion may be positioned to be joined to a peripheral wall of the cylindrical structure of the first housing portion, and the first opening and the second opening may be disposed in the cylindrical structure of the first housing portion, optionally at the peripheral wall of the cylindrical structure.

In some embodiments, the first and second curved reflecting elements may be arranged outside of a circumferential inner surface portion of the optical cavity. In particular, the first curved reflecting element may be further arranged to direct light originating from a first location below the lower inner surface of the optical cavity into the optical cavity. Also, the second curved reflecting element may be further arranged to direct the light from the optical cavity to a second location below the lower inner surface of the optical cavity.

In some embodiments, the first and second openings may be horizontal openings located on the lower inner surface of the optical cavity. The first curved reflecting element may extend from the upper inner surface of the optical cavity towards the first opening and the second curved reflecting element may extend from the upper inner surface of the optical cavity towards the at least one second opening. The first curved reflecting element and the second curved reflecting element may be arranged as a respective extending part of the second housing portion, or in part of the respective extending part. In particular, the first curved reflecting element and the second curved reflecting element may be disposed according to a position of the first opening and a position of the second opening, respectively, such that the light is directed by the first curved reflecting element from the light source into the optical cavity through the first opening and is directed by the second curved reflecting element from the optical cavity to the detector through the at least one second opening.

In some embodiments, the respective extending part or a part of the respective extending part of the second housing portion may have an inclined surface on which the respective first and second curved reflecting element is formed. Specifically, the inclined surfaces may be positioned corresponding to the position of the first opening and the position of the second opening, respectively.

In some embodiments, the first housing portion and the second housing portion may be formed by means of injection molding. Moreover, the inner surfaces of the optical cavity may be coated with optically reflective material. In particular, the reflective material may be reflective at a wavelength of the light source. For example, the first curved reflecting element and the second curved reflecting element may each comprise a respective curved mirror coated with optically reflective material reflective at a wavelength of the light source. In some embodiments, the optical module component may further comprise an optical filter arranged to filter the light from the optical cavity prior to reaching the detector. The optical filter may then be disposed in the at least one second opening and/or on top of the guiding reflector as mentioned above. In some embodiments, the first opening and the second opening may be positioned relative to each other at 90 degrees azimuthal angle in the diameter plane of the optical cavity.

Configured as above, the optical cavity may have a cylindrical shape that is coated with reflective material at the wavelength of the light source to propagate the coupled light towards the detector. The optical housing may contain a gas inlet/outlet port through which gas and air can flow into the cavity. As the light propagates, it will interact with and may be absorbed by the flowing gases inside the cavity. Besides, a miniaturized curved mirror above the detector may direct the light from the optical cavity through an aperture (opening) onto the detector on an external printed circuit board (PCB). In this way, single-channel gas sensing may be achieved in a precise and efficient manner, since the light propagating path inside the cavity can be increased, thereby enhancing the light absorption by the gas.

In some embodiments, the optical module component may further comprise one or more further second openings together with a respective optical filter disposed at pre-defined angular locations in the first housing portion. Similarly, the one or more respective optical filters may be arranged to filter the light from the optical cavity. In this case, the optical module component may further comprise one or more further second curved reflecting elements associated with the one or more further second openings and arranged to direct the light of a respective wavelength of the light source from the optical cavity to a respective detector through the respective further second opening with the respective optical filter. In such embodiments, the first opening and the second opening may be positioned relative to each other at 30 degrees or 60 degrees azimuthal angle in the diameter plane of the optical cavity. Although examples of positioning the first opening and the second opening at 30 degrees or 60 degrees azimuthal angle in the diameter plane of the optical cavity relative to each other are explicitly mentioned, other azimuthal angles instead of 30 degrees or 60 degrees may also be applied for multi-channel gas sensing applications.

In some embodiments, the optical module component may further comprise at least one gas port for serving as a gas inlet to and/or gas outlet from the optical cavity. The at least one gas port may be disposed on the lower inner surface or the upper inner surface of the optical cavity.

According to another aspect of the present disclosure, there is provided a gas sensor. The gas sensor may have and be implemented based on (e.g., by using) the optical module component having an optical cavity according to the forgoing aspect as well as any one of the embodiments thereof. The gas sensor may also comprise a printed circuit board (PCB) arrangement attached to the optical module component. The PCB arrangement may comprise a light source configured to emit light for propagating in the optical cavity of the optical module component. The PCB arrangement may further comprise an optical detector configured to detect light from the optical cavity of the optical module component.

For example, the optical module may comprise a bottom part and a top part. The bottom part of the device may comprise a cylindrical wall with a certain height (e.g., with dimension in a range of a few millimeters) and two openings to transmit the light from the light source to the optical detector. The openings above the light source may be a cone reflector with a certain height (e.g., in a range of a few millimeters) and an angle (e.g., 90 degrees) relative to each other to couple the light into the cavity structure. On the other hand, the top part of the module may comprise a flat plate that closes the cylindrical structure to create an optical cavity and additionally two mirrors that reflect light, one from the light source to the cavity and one from the cavity to the optical filter and the detector.

For example, the optical module according to the present disclosure may comprise two reflection curved mirrors with specific physical dimension and curvatures. The optical module according to the present disclosure may also comprise a truncated cone reflector with a suitable circular diameter at the top and bottom and with a proper height from the optical body to a very close distance above the light source. Besides, the optical module may also include two openings positioned at e.g., 90 degrees to each other for the dedicated light source and the detector. However, the position of the apertures may also be placed at any predefined angle to each other in the cylinder structure for other implementations. It should be further noted that the optical module may also comprise a cylindrical structure with a pre-defined cylinder diameter and wall height, and the cavity may comprise reflective internal coating surfaces at light source wavelength.

In some embodiments, the guiding reflector and the first curved reflecting element may be arranged to be substantially close to the light source. In some embodiments, the PCB arrangement may further comprise an optical filter arranged to filter the light from the optical cavity prior to reaching the detector. In some embodiments, the PCB arrangement may further comprise a controller configured to drive the light source and to process an optical signal of the detected light. The light source may comprise an optical source suitable for gas detection/measurement using NDIR, for example, a filament. The optical detector may comprise a light detector suitable for gas detection/measurement using NDIR, for example, a thermopile. It should be noted that other types of detectors and sources may be used for implementing the gas sensor according to the present disclosure.

Configured as above, the disclosure provides a compact NDIR gas sensor module to detect a predetermined gas of interest using a compact optical cavity structure. The sensor module includes an injection molded optical cavity structure that is clipped/glued to a printed circuit board (PCB) arrangement to provide the entire module. The PCB contains a filament as the optical source, a thermopile as the optical detector, and a microcontroller to drive the filament and to process the detected signal. In this way, by Integrating miniaturized optical components into the optical body, an efficient gas sensing approach may be provided to improve detection performance while maintaining the enclosure in a very compact size.

According to yet another aspect of the present disclosure, there is provided a method for manufacturing an optical module component for a gas sensor. The method may comprise providing a first housing portion and a second housing portion of the optical module component. The method may also comprise joining the first housing portion to the second housing portion to form a substantially cylindrical optical cavity. In particular, a lower inner surface of the optical cavity may be formed by the first housing portion and an upper inner surface of the optical cavity may be formed by the second housing portion. The method may further comprise providing a first opening for receiving light from a light source, and providing at least one second opening for passing light from the optical cavity to a detector. In particular, the method may additionally comprise providing a first curved reflecting element between the first housing portion and the second housing portion for directing the light from the light source into the optical cavity, and providing a second curved reflecting element between the first housing portion and the second housing portion for directing the light from the optical cavity to the detector. Specifically, optical axes of the first and second curved reflecting elements may be tilted with respect to a diametral plane of the optical cavity.

In some embodiments, the method may further comprise determining a tilt angle of the first curved reflecting element with respect to the diametral plane of the optical cavity and a tilt angle of the second curved reflecting element with respect to the diametral plane of the optical cavity, such that the light from the light source is directed into the optical cavity by the first curved reflecting element through the first opening and the light from the optical cavity is directed to the detector by the second curved reflecting element through the at least one second opening. In some embodiments, the method may further comprise providing a guiding reflector with a truncated cone shape for coupling the light from the light source into the optical cavity. In some embodiments, the method may further comprise providing a flat surface and the guiding reflector for the first housing portion and a cylindrical structure and the first and second curved reflecting element for the second housing portion. In this case, the flat surface of the second housing portion may be positioned to be joined to a peripheral wall of the cylindrical structure of the first housing portion, and the method may further comprise arranging the first opening and the second opening at the flat surface of the first housing portion.

In some embodiments, the method may further comprise providing a cylindrical structure for the first housing portion and a flat surface for the second housing portion. In this case, the flat surface of the second housing portion may be positioned to be joined to a peripheral wall of the cylindrical structure of the first housing portion, and the method may further comprise arranging the first opening and the second opening in the cylindrical structure of the first housing portion, and optionally at the peripheral wall of the cylindrical structure.

In some embodiments, the first and second curved reflecting elements may be arranged outside of a circumferential inner surface portion of the optical cavity. Besides, the first curved reflecting element may be further arranged to direct light originating from a first location below the lower inner surface of the optical cavity into the optical cavity, and the second curved reflecting element may be further arranged to direct the light from the optical cavity to a second location below the lower inner surface of the optical cavity.

In some embodiments, the first and second openings may be horizontal openings located on the lower inner surface of the optical cavity. Moreover, the first curved reflecting element may extend from the upper inner surface of the optical cavity towards the first opening, and the second curved reflecting element may extend from the upper inner surface of the optical cavity towards the at least one second opening.

In some embodiments, the method may further comprise providing the first curved reflecting element and the second curved reflecting element as a respective extending part of the second housing portion, or in part of the respective extending part. The method may further comprise arranging the first curved reflecting element and the second curved reflecting element according to a position of the first opening and a position of the second opening, respectively, such that the light is directed by the first curved reflecting element from the light source into the optical cavity through the first opening and is directed by the second curved reflecting element from the optical cavity to the detector through the at least one second opening.

In some embodiments, the respective extending part or a part of the respective extending part of the second housing portion may have an inclined surface on which the respective first and second curved reflecting element is formed. In particular, the inclined surfaces may be positioned corresponding to the position of the first opening and the position of the second opening, respectively.

In some embodiments, the first housing portion and the second housing portion may be provided by means of injection molding. In some embodiments, the method may further comprise coating the inner surfaces of the optical cavity with optically reflective material. In some embodiments, the method may further comprise providing a respective curved mirror as the first and second curved reflecting element, and coating the respective curved mirrors with optically reflective material.

In some embodiments, the method may further comprise providing an optical filter for filtering the light from the optical cavity prior to reaching the detector. In particular, the optical filter may be disposed in the at least one second opening and/or on top of the guiding reflector as mentioned above. In some embodiments, the method may further comprise positioning the first opening and the second opening relative to each other at 90 degrees azimuthal angle in the diameter plane of the optical cavity.

In some embodiments, the method may further comprise providing one or more further second openings together with a respective optical filter at predefined angular locations in the first housing portion for filtering the light from the optical cavity, and providing one or more further second curved reflecting elements associated with the one or more further second openings for directing the light of a respective wavelength of the light source from the optical cavity to a respective detector through the respective further second opening with the respective optical filter. In this case, the first opening and the second opening may be positioned relative to each other at 30 degrees or 60 degrees azimuthal angle in the diameter plane of the optical cavity.

In some embodiments, the method may further comprise providing at least one gas port on the lower inner surface or the upper inner surface of the optical cavity for serving as a gas inlet to and/or gas outlet from the optical cavity.

Configured as above, the method for manufacturing an optical module component for a gas sensor according to the present disclosure provides an efficient and accurate way for gas sensing, because the efficiency of coupling the light source into the optical cavity can be improved, thereby maximizing the light absorption of the gas. On the other hand, the light source can be kept relatively far away from the main body of the optical cavity. To this end, a configuration of combining a miniaturized optical cone reflector with a curved reflection mirror may be applied, which is to be placed at a very close distance above the light source, in order to reduce the divergence angle of the light beam and therefore to guide the light more efficiently into the optical cavity.

In particular, the optical cavity may be provided with a cylindrical shape that is coated with reflective material at the wavelength of the light source to propagate the coupled light towards the detector. As the light propagates, it will interact with and may be absorbed by the flowing gases inside the cavity. Besides, a miniaturized curved mirror above the detector may direct the light from the optical cavity through an aperture (opening) onto the detector arranged on an external printed circuit board (PCB). In this way, single-channel gas sensing may be achieved in a precise and efficient manner, since the light propagating path inside the cavity can be increased, thereby enhancing the light absorption by the gas.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates, in a top view, an exemplary structure of an optical module component 100 for a gas sensor according to embodiments of the present disclosure, FIG. 2 schematically illustrates a cross-sectional view corresponding to a drawing along A-A line indicated in FIG. 1, FIG. 3A schematically illustrates, in a three-dimensional (3D) view, an exemplary arrangement within the optical module component 100 for the first housing portion 101 according to embodiments of the present disclosure, FIG. 3B schematically illustrates, in a three-dimensional (3D) view, an exemplary arrangement within the optical module component 100 for the second housing portion 102 according to embodiments of the present disclosure, FIG. 3C schematically illustrates a detailed three-dimensional (3D) view of an exemplary structure of the optical module component 100 with the first housing portion 101 affixed to the second housing portion 102 according to embodiments of the present disclosure, FIG. 4 schematically illustrates a cross-sectional view corresponding to a drawing along B-B line indicated in FIG. 1, FIG. 5 schematically shows a flowchart illustrating an example of a method 500 for manufacturing an optical module component for a gas sensor according to embodiments of the present disclosure, FIG. 6 schematically illustrates a cross-sectional view of a gas sensor 200 comprising the above described optical module component 100 with a PCB arrangement 112 along A-A line indicated in FIG. 1 according to embodiments of the present disclosure, FIG. 7 schematically illustrates a cross-sectional view of a gas sensor 200 comprising the above described optical module component 100 with a PCB arrangement 112 along B-B line indicated in FIG. 1 according to embodiments of the present disclosure, FIG. 8A schematically illustrate the PCB arrangement 112 to be combined with the optical module component 100 for implementing the gas sensor 200 according to embodiments of the present disclosure, FIG. 8B schematically illustrate the PCB arrangement 112 to be combined with the optical module component 100 for implementing the gas sensor 200 according to embodiments of the present disclosure, FIG. 9A schematically illustrates, in a top view, another exemplary structure of an optical module component 100 for a gas sensor according to embodiments of the present disclosure, FIG. 9B schematically illustrates a cross-sectional view corresponding to a drawing along A-A line indicated in FIG. 9A, FIG. 9C schematically illustrates a cross-sectional view corresponding to a drawing along B-B line indicated in FIG. 9A, FIG. 10A schematically illustrates, in a three-dimensional view, an exemplary arrangement within the optical module component 100 of FIG. 9A for the first housing portion 101 according to embodiments of the present disclosure, FIG. 10B schematically illustrates, in a three-dimensional (3D) view, an exemplary arrangement within the optical module component 100 of FIG. 9A for the second housing portion 102 according to embodiments of the present disclosure, FIG. 10C schematically illustrates a detailed three-dimensional view of an exemplary structure of the optical module component 100 of FIG. 9A with the first housing portion 101 affixed to the second housing portion 102 according to embodiments of the present disclosure, and FIG. 11 schematically illustrate the PCB arrangement 112 to be combined with the optical module component 100 of FIG. 9A for implementing the gas sensor 200 according to embodiments of the present disclosure.

DETAILED DESCRIPTION

As indicated above, identical or like reference numbers in the present disclosure may, unless indicated otherwise, indicate identical or like elements, such that repeated description thereof may be omitted for reasons of conciseness.

Nondispersive infrared (NDIR) gas sensors may detect the presence and concentration of various gases by selecting a narrow band spectral region that overlaps with the absorption region of the gas of interest. As mentioned above, employment of a broadband lamp source and an optical filter integrated with a sample chamber may allow an NDIR sensor to be as good candidate for gas measurement. However, such an NDIR sensor is very complex and expensive, which limits its applications.

In view thereof, in a broad sense, the present disclosure generally proposes techniques and/or mechanisms for improvement in design and/or manufacturing of NDIR gas sensors, and more particularly, in a compact and cost-efficient manner.

Figure 1:
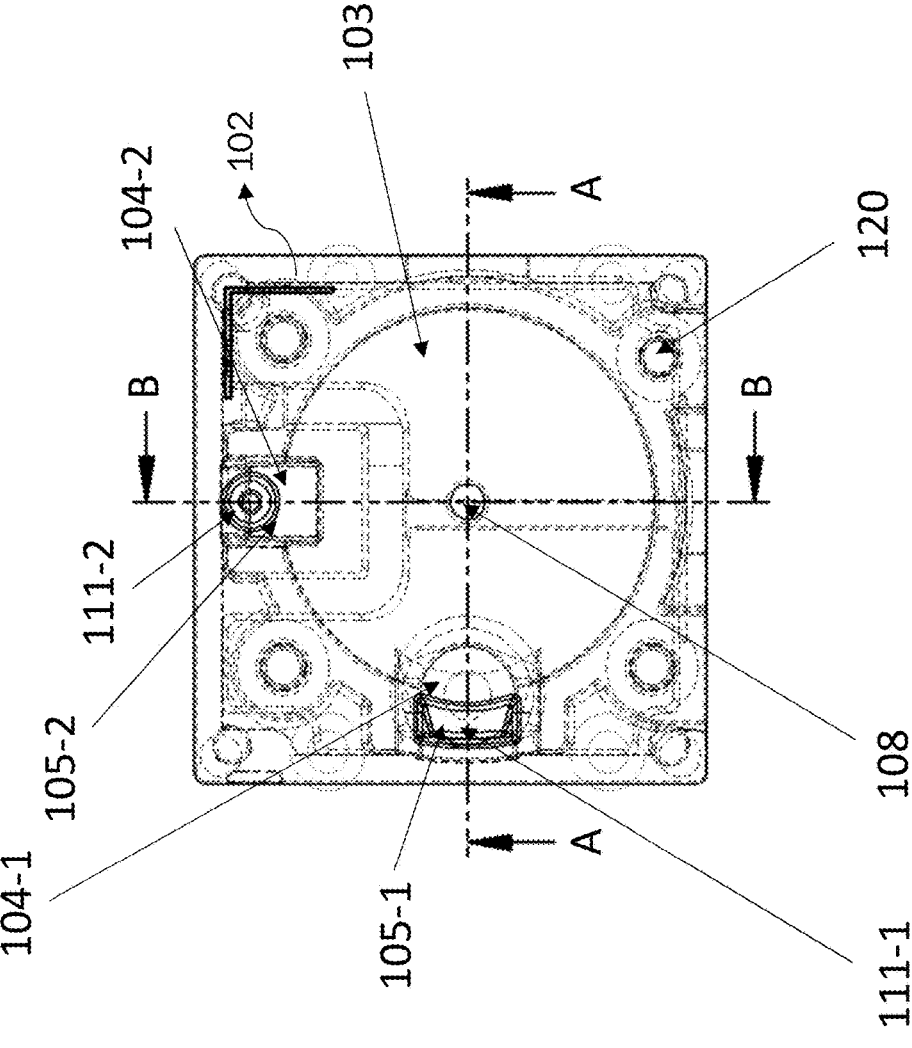

FIG. 1 schematically illustrates, in a top view, an exemplary structure of an optical module component 100 for a gas sensor according to embodiments of the present disclosure. The optical module component 100 may comprise, among others, a first housing portion 101 (not shown), a second housing portion 102, a first opening 104-1, a second opening 104-2, a first curved reflecting element 105-1 and a second curved reflecting element 105-2. In particular, the first housing portion 101 and the second housing portion 102 may be joined together by means of injection molding to form a substantially cylindrical optical cavity 103 when both housing portions are joined together. Thus, a lower inner surface of the optical cavity 103 may be formed by the first housing portion 101 and an upper inner surface of the optical cavity 103 may be formed by the second housing portion 102. Herein, for illustrative purposes the first housing portion 101 of the optical module component 100 in FIG. 1 is shown in opaque, while the second housing portion 102 of the optical module component 100 is shown in a transparent view for illustrating the structural combination of the two housing portions 101, 102 forming the gas sensor optical cavity 103 of the optical module.

The first opening 104-1 of the optical module component 100 may receive light from a light source. The light source may comprise for example, a filament external to the optical module component 100 (not shown in FIG. 1). The second opening 104-2 of the optical module component 100 may allow light from the optical cavity 103 to pass towards a detector external to the optical module component 100. Without intended limitation, the detector may comprise e.g., a thermopile as an optical detector external to the optical module component 100 (not shown in FIG. 1). The light source may also comprise other types of optical sources such as light-emitting diodes (LEDs) and the optical detector may also comprise other types of detectors such as solid-state detectors.

Furthermore, the first curved reflecting element 105-1 may direct the light from the (external) light source into the optical cavity 103, and the second curved reflecting element 105-2 may direct the light from the optical cavity 103 to the (external) detector.

Figure 2:
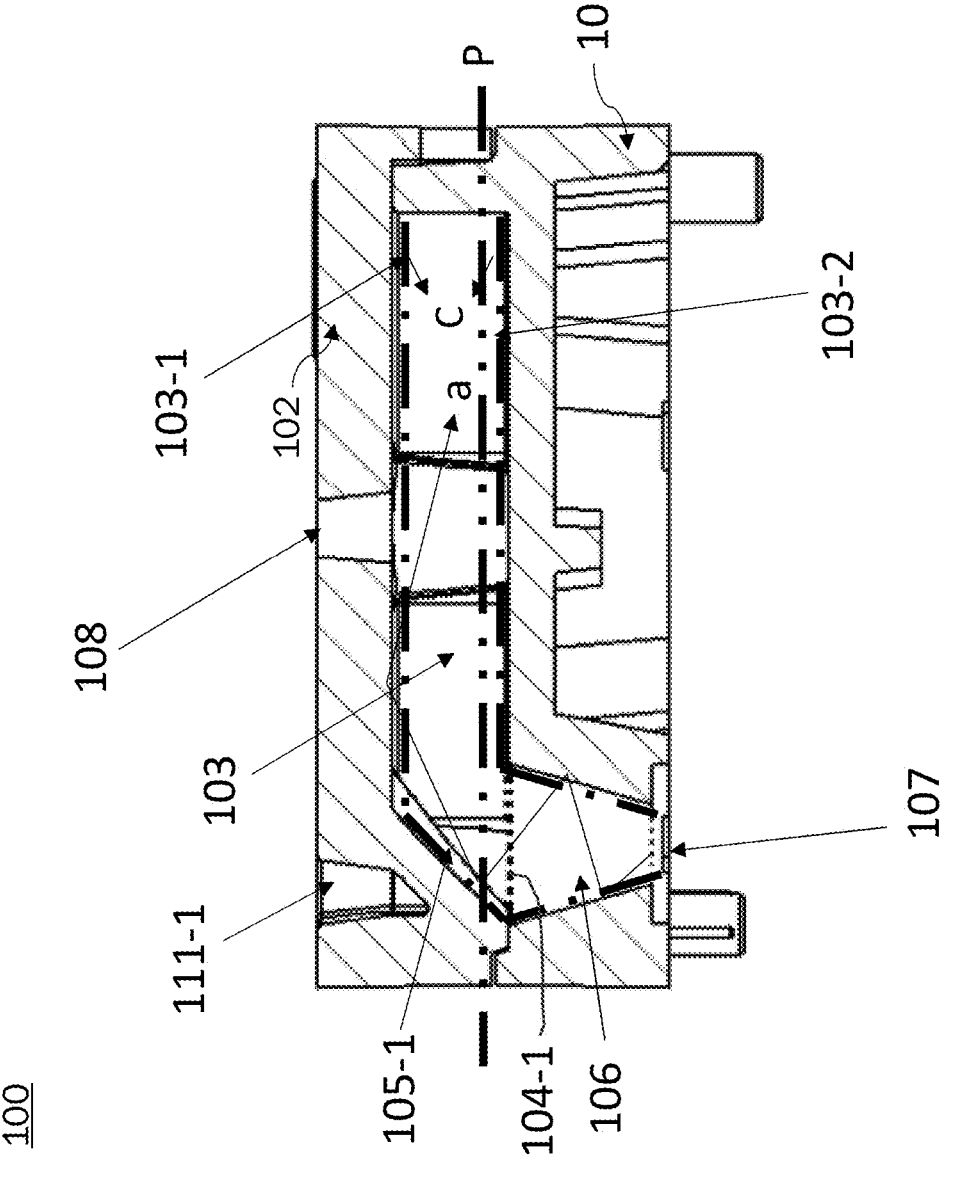
Figure 4:
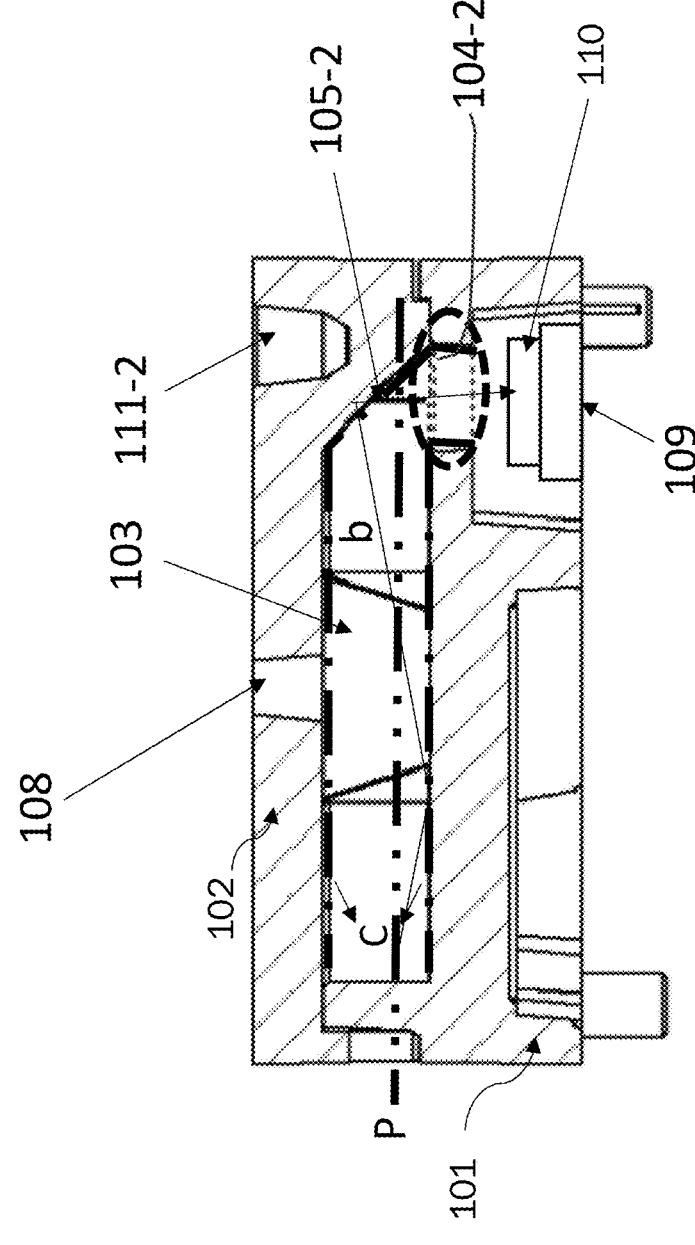

For better understanding, reference is made to FIG. 2 and FIG. 4 which schematically illustrate a respective side view of the optical module component 100 of FIG. 1 according to embodiments of the present disclosure: FIG. 2 is a cross-sectional view corresponding to a drawing along A-A line indicated in FIG. 1, and FIG. 4 is a cross-sectional view corresponding to a drawing along B-B line indicated in FIG. 1. That is, FIG. 2 and FIG. 4 show a respective cross section of both housing portions 101, 102. The same reference numbers shown in FIGS. 2 and 4 as in FIG. 1 may represent the same or similar structure or components which will not herein be repeated for conciseness.

As illustrated in FIG. 2, the first opening 104-1 of the optical module component 100 is arranged to receive light from an external light source such as a filament 107. As illustrated in FIG. 4, the second opening 104-2 of the optical module component 100 is arranged to pass light from the optical cavity 103 to an external detector such as a thermopile 109. In the embodiment, the filament 107 is not part of the optical module component 100, but is part of an (external) electronic board (e.g., a print circuit board (PCB), as more clearly illustrated in FIGS. 6-8) to which the optical module 100 is attached (via e.g., clipping or gluing to affix the optical module to the PCB). Similarly, the thermopile 109 is not part of the optical module component 100, but is part of the PCB to which the optical module component 100 is attached.

Since different gases have different own absorption wavelengths (e.g., an absorption wavelength of 4.26 mm for $CO_2$), a corresponding optical filter may be used to filter out the absorption wavelength of the gas of interest from a broad spectrum of the filament light, in order to avoid detecting gases other than the gas of interest. As shown in FIG. 4, an optical filter 110 is additionally placed on the thermopile detector 109 for filtering the light from the optical cavity 103 prior to reaching the detector 109. Although the optical filter 110 is disposed on the detector as part of the external PCB in the present example, the optical filter 110 may alternatively be placed inside the optical module component 100 (as shown by the dashed circle in FIG. 4) in some embodiments in case a gas sensor module shall be designed in a smaller size. In this case, the optical module component 100 may also include an optical filter 110 arranged to filter the light from the optical cavity 103.

As shown in FIG. 2 and FIG. 4, it is further noted that optical axes of the first and second curved reflecting elements 105-1, 105-2 are tilted with respect to a diametral plane (indicated by the plane P) of the optical cavity 103. The respective tilt angles of the first curved reflecting element 105-1 and the second curved reflecting element 105-2 may be adjusted to direct the light from the light source 107 into the optical cavity 103 (as shown by the light propagation path a) and to direct the light from the optical cavity 103 to the detector 109 (as shown by the light propagation path b), respectively. In order to enhance the efficiency in gas detection, a guiding reflector 106 may be provided within the optical module component 100 for coupling the light from the light source 107 into the optical cavity 103. For example, the guiding reflector 106 may have a truncated cone shape with a smaller diameter part pointing towards the light source 107 to increase the coupling efficiency.

As illustrated in FIG. 1, the first housing portion 101 may have a cylindrical structure and the second housing portion 102 may be in a form of a flat surface (e.g., a plate). When both housing portions are combined in a joined position, the flat surface of the second housing portion 102 is positioned to be joined to a peripheral wall of the cylindrical structure of the first housing portion 101. In the embodiment, the first opening 104-1 and the second opening 104-2 are disposed in the cylindrical structure of the first housing portion 101, and optionally at the peripheral wall of the cylindrical structure, as also shown in FIGS. 2 and 4. In some embodiments, the first and second curved reflecting elements 105-1, 105-2 may be arranged outside of a circumferential inner surface portion of the optical cavity 103. In particular, the first curved reflecting element 105-1 may be further arranged to direct light originating from a first location below the lower inner surface of the optical cavity into the optical cavity 103, and the second curved reflecting element 105-2 may be further arranged to direct the light from the optical cavity 103 to a second location below the lower inner surface of the optical cavity 103.

It should be noted that the arrangement of the optical module component 100 as shown in the above mentioned figures are merely illustrative and other possible arrangements which allow the light from the light source to pass and propagate within the optical cavity 103 to reach the detector for the purpose of gas measurement/detection shall not be excluded from the implementation of the inventive concept proposed by the present disclosure. For example, the first and second openings 104-1, 104-2 may be formed in the first housing portion 101, and the first and second curved reflective elements 105-1, 105-2 may be formed in either of the first and second housing portions 101, 102.

For example, the first and second openings 104-1, 104-2 may be horizontal openings located on the lower inner surface (i.e., in the bottom) of the optical cavity 103. Also, the first curved reflecting element 105-1 may extend from the upper inner surface of the optical cavity 103 towards the first opening 104-1, and the second curved reflecting element 105-2 may extend from the upper inner surface of the optical cavity 103 towards the second opening 104-2. For example, the first curved reflecting element 105-1 and the second curved reflecting element 105-2 may be arranged as a respective extending part of the second housing portion 102, or in part of the respective extending part, and disposed according to a position of the first opening 104-1 and a position of the second opening 104-2, respectively, such that the light is directed by the first curved reflecting element 105-1 from the light source 107 into the optical cavity 103 through the first opening 104-1 (see light propagation path a) and is directed by the second curved reflecting element 105-2 from the optical cavity 103 to the detector 109 through the second opening 104-2 (see light propagation path b).

In some embodiments, the respective extending part or a part of the respective extending part of the second housing portion 102 may have an inclined surface on which the respective first and second curved reflecting element 105-1, 105-2 is formed. Accordingly, the inclined surfaces may be positioned corresponding to the position of the first opening 104-1 and the position of the second opening 104-2, respectively. It is noted that the inclined surface may be formed (exclusively) at a portion of the optical module component 100 that overlap the light source 107 (e.g., the filament) and the optical detector 109 (e.g., an infrared sensor). In other words, the cylindrical structure wall (i.e., the peripheral wall) except for where the openings 104-1 and 104-2 is has a vertical form instead of an inclined form in order to increase the path length of the light propagating within the cavity 103.

It is further noted that the inner surfaces 103-1, 103-2 of the optical cavity 103 may be coated with optically reflective material. The reflective material may be reflective at a wavelength of the light source. Besides, the first curved reflecting element 105-1 and the second curved reflecting element 105-2 each may comprise a respective curved mirror coated with the optically reflective material. In this way, the light reflected from the curved mirror above the filament 107 can circulate inside the cylindrical structure (i.e., the optical cavity 103) through multiple reflections from the vertical wall of the cavity 103 to maximize light absorption. Since the light absorption depends on the optical path length between the filament 107 and the detector 109, the absorption can be increased by increasing the path length, which further provides higher sensitivity in gas detection.

Moreover, the first opening 104-1 and the second opening 104-2 may be positioned relative to each other at 90 degrees azimuthal angle in the diameter plane of the optical cavity 103, as shown in FIG. 1. That is, the light source 107 (e.g., the filament) and the optical detector 109 (e.g., an infrared sensor) may not be arranged in line, in order to facilitate multiple reflections inside the cavity 103. This assists to increase the light path length for enhancing the sensitivity of the gas sensor module.

In the above mentioned embodiments as illustrated in FIGS. 1 to 4, one second opening is provided for single-channel gas detection. In some other embodiments, however, the optical module component can be implemented as a multi-channel gas sensor by, for example, adding multiple detectors with different optical filters and multiple apertures (openings) in the cylinder structure with prespecified angular locations. Accordingly, the optical module component 100 may further include one or more further second openings 104-2 together with a respective optical filter 110 disposed at predefined angular locations in either of the first and second housing portions 101, 102. Similar to the optical filter as mentioned above, the additional one or more respective optical filters may be arranged to filter the light from the optical cavity 103. In particular, the optical module component 100 further comprises one or more further second curved reflecting elements 105-2 associated with the one or more further second openings 104-2 and arranged to direct the light of a respective wavelength of the light source 107 from the optical cavity 103 to a respective detector 109 through the respective further second opening 104-2 with the respective optical filter 110.

For example, the optical module component may include a further opening and a further detector for the reference measurement so that the sensor can be used for two-channel NDIR gas detection. In the multi-channel NDIR case, the first opening and the second opening(s) may be positioned relative to each other at a predefined angle, e.g., 30 degrees or 60 degrees azimuthal angle in the diameter plane of the optical cavity 103.

It is noted that the first housing portion 101 and the second housing portion 102 may be formed by means of injection molding. As shown in the embodiment of FIGS. 1, 2 and 4, the optical module component 100 of the gas sensor is formed by the first housing portion 101 (as the bottom part of the optical cavity 103) and the second housing portion 102 (as the top part of the optical cavity 103). That is, the optical module component 100 may be provided with a combination of miniaturized optical components integrated into the optical cavity 103 manufactured by injection molding. Hence, the entire optical assembly for the gas sensor may be made from two separate injection molded parts, which are then joined together to form a one-piece optical module component 100. It is further noted that, by producing the optical module component in two parts, gas sensor modules can be manufactured by injection molding (e.g., polymer typed resin, thermosetting typed epoxy resin) to achieve high volume production and low manufacturing cost. For example, the polymer typed resin may be polymethyl methacrylate, which is so called "PMMA", or any other similar polymer based material. Besides, it is also allowed for coating the surface of the optical components (e.g., the shadowed part indicated by dashed line C in FIG. 1) within the optical module component.

It should be noted that, apart from injection molding, other suitable techniques for producing the internal configuration/structure of the optical module component as described above may also be utilized without departing from the scope of the present disclosure.

In addition, the optical module component 100 may further comprise at least one gas port 108 configured to inlet gas into the optical cavity 103 and/or outlet gas from the optical cavity 103. The at least one gas port 108 may be disposed on the lower inner surface or the upper inner surface of the optical cavity 103. The at least one gas port 108 with sufficiently large size may work for both inlet and outlet of gas. Also, the optical module component 100 may optionally be provided with recess portions 111-1, 111-2 (see FIGS. 2 and 4) in the proximity of the first and second curved reflecting elements 105-1, 105-2 for assisting the manufacture of precise curved mirrors (as the first and second curved reflecting elements 105-1, 105-2) in injection molding.

Figures 3A, 3B:
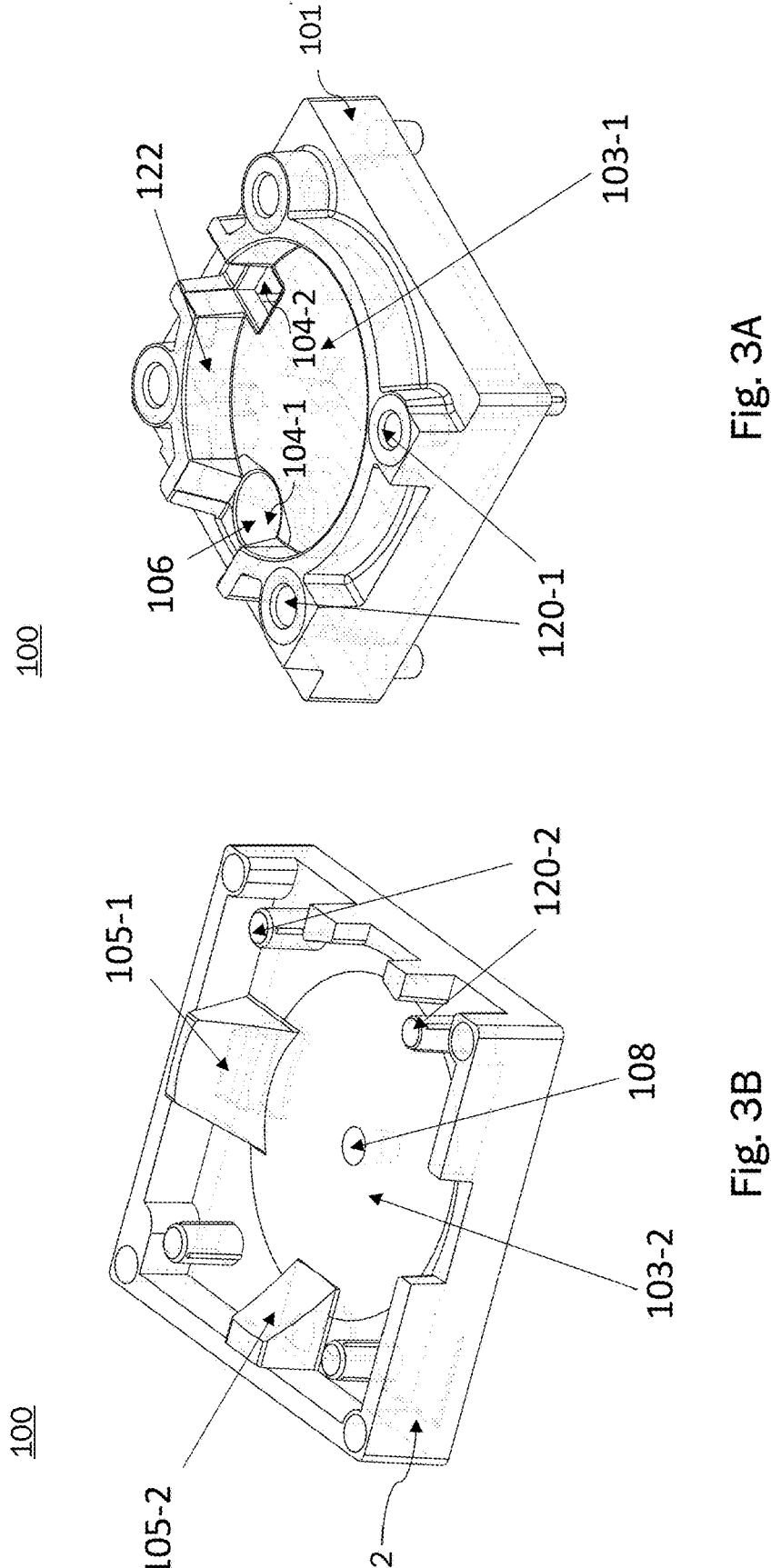
Figure 3C:
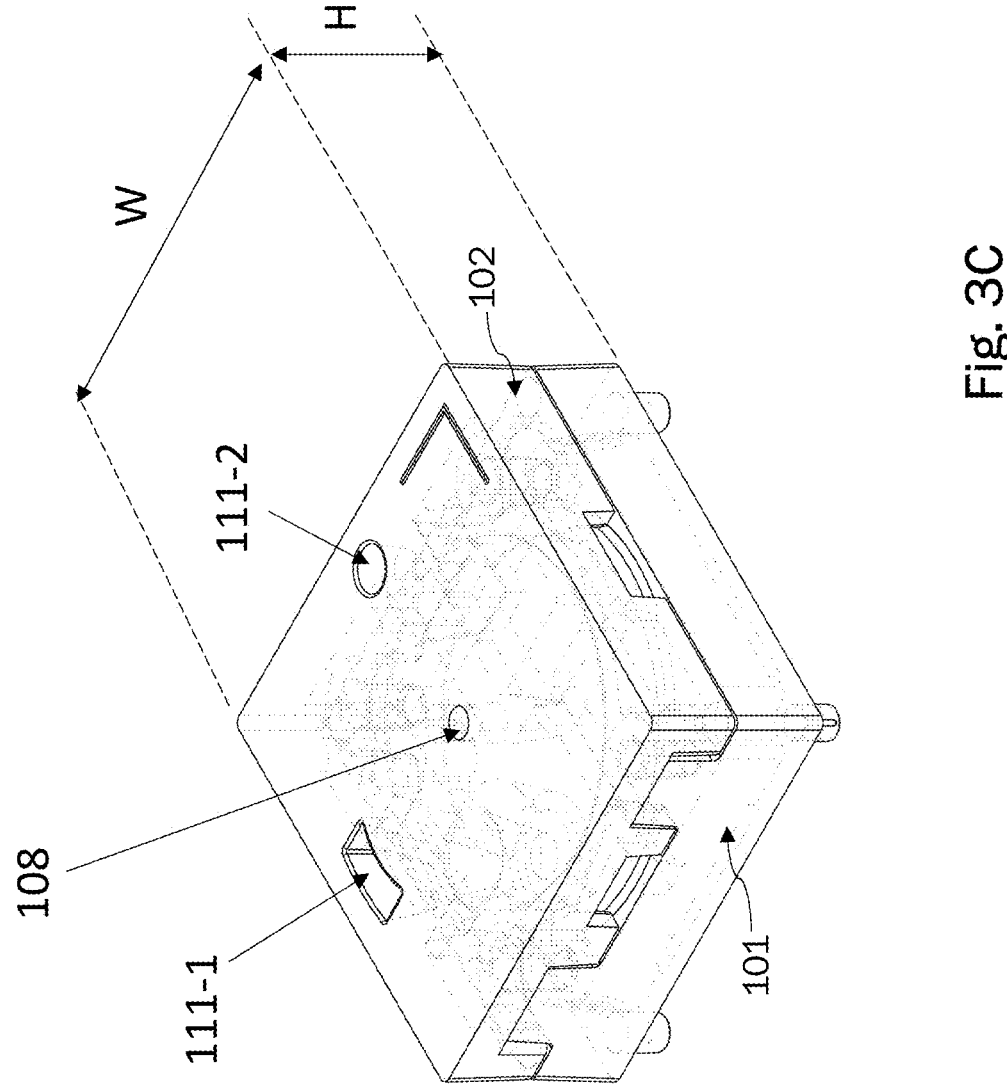

A more detailed three-dimensional (3D) view of the proposed gas sensor module is shown in FIGS. 3A to 3C. FIG. 3A schematically illustrates, in a 3D top view, an exemplary arrangement within the optical module component 100 for the first housing portion 101 according to embodiments of the present disclosure. FIG. 3B schematically illustrates, in a 3D top view, an exemplary arrangement within the optical module component 100 for the second housing portion 102 according to embodiments of the present disclosure. The same reference numbers shown in FIGS. 3A and 3B as in FIGS. 1, 2 and 4 may represent the same or similar structure or components which will not herein be repeated for conciseness. Herein, the first housing portion 101 may be referred to the bottom part of the optical module component 100 forming the lower inner surface of the optical cavity 103, and the second housing portion 102 may be referred to the top part of the optical module component 100 forming the upper inner surface of the optical cavity 103. In this embodiment, curved mirrors as the first and second curved reflecting elements 105-1, 105-2 are at the top part (the first portion 101), while the cylindrical wall 122 and the openings 104-1, 104-2 connected to the cone reflector 106 are at the bottom part (the second portion 102). In other embodiments, however, the positions of the curved reflecting elements and the openings may vary for optimizing/minimizing the size of the optical module component. For example, the curved reflecting elements may be, alternatively or additionally, disposed at the bottom part (the second portion 102) together with the openings.

In some embodiments, the top part of the injection molded optical cavity (i.e., the second housing portion 102) may be provided with respective inclined surfaces on which the respective curved mirrors can be formed as the first and second curved reflecting elements 105-1, 105-2. In this case, the inclined surfaces may mainly or exclusively be formed at portions (of the second housing portion 102) above the light source (filament) 107 shown in FIG. 2 and the optical detector 109 shown in FIG. 4, respectively. In other words, other portions of the top part of the injection molded optical cavity may not be provided with inclined, curved surface but rather a horizontal, flat surface to be joined with the rest of the cylindrical wall which is vertical.

Thus, the flat portion/surface (plate) of the second housing portion 102 may be positioned corresponding to a peripheral vertical wall of the cylindrical structure of the first housing portion 101, and the first and the second curved reflecting elements 105-1, 105-2 are arranged as a respective extending part of the second housing portion 102, or in part of the respective extending part, extending from the flat portion/surface, and disposed according to the positions of the first and second openings of the first housing portion 101, respectively, such that the light is directed by the first curved reflecting element 105-1 from the light source 107 into the optical cavity 103 through the first opening 104-1 and is directed by the second curved reflecting element 105-2 from the optical cavity 103 to the detector 109 through the second opening 104-2.

As mentioned above, the inner surfaces 103-1, 103-2 of the optical cavity 103 may be coated with optically reflective material, as shown in the shadowed part of FIG. 3. It is noted that the inner surface 103-1 formed by the first housing portion 101 may also include the (inner) surface of the cone reflector 106 which may also to be coated with the optically reflective material. The reflective material may comprise metal material reflective at a wavelength of the light source, such as aluminum. Accordingly, in order to manufacture such an optical module for gas sensing as proposed in the present disclosure, injection molding of polymer material (e.g., resin) may be applied to form the two separate parts (e.g., the bottom and top part) of the module, followed by coating the inner surfaces of the two parts with e.g., aluminum (as shown in the shadowed area) to allow the light to reflect inside the cavity. Subsequently, the two separate parts (i.e., the first and second housing portions) may be combined together via one or more joining elements 120-1, 120-2 thereof. As shown in FIGS. 3A and 3B, the joining element 120-2 of the second housing portion (the top/upper part) 102 may be inserted into the joining element 120-1 of the first housing portion (the bottom/lower part) 101 to affix the second housing portion 102 to the first housing portion 101. In this way, the optical cavity 103 having a cylindrical shape may be formed, which is coated with optically reflective material at a wavelength of the light source in order to guide the coupled light from the light source towards the detector. FIG. 3C schematically illustrates a detailed 3D top view of an exemplary structure of the optical module component 100 with the first housing portion 101 affixed to the second housing portion 102 according to embodiments of the present disclosure.

As mentioned above, the guiding reflector 106 may have a truncated cone shape with a smaller diameter part pointing towards the light source (not shown). Again, the coated portion of the module is shown in the shadowed area. In the embodiment, the truncated cone reflector 106 may have a certain circular diameter at its top and bottom sides and may have a certain height from the body (e.g., the first opening) of the optical module component to a very close distance above the light source, in order to better couple the light from the light source into the cavity 103 of the optical module component. The top side of the cone reflector 106 may be connected to the first opening 104-1 at the first housing portion 101, while the bottom side of the cone reflector 106 may locate away from the first opening 104-1 and closely above the light source. For example, the circular diameter (e.g., in a millimeter range) at the bottom side of the cone reflector 106 may be smaller than the circular diameter at the top side of the cone reflector 106 (e.g., also in the millimeter range). For example, the cone reflector 106 may have a certain height (e.g., in a range of a few millimeters) from the first opening of the optical module component to a very close distance (e.g., also in the millimeter range or less) above the light source.

In some embodiments, the cylindrical structure 103 of the optical module component 100 may have a predefined cylinder diameter (e.g., in a range of a few millimeters to a few centimeters) and wall height (e.g., in a range of a few millimeters). Correspondingly, the optical module component for a gas sensor as proposed in the present disclosure may have, for example, a dimension in a range of a few millimeters to a few centimeters in length (L) and in width (W), and a dimension in a range of a few millimeters in height (H), as illustrated in FIG. 3.C. A more compact optical module component having smaller size can be achieved by employing the techniques as disclosed in the present application. For example, by arranging the openings and the curved reflective elements in a different way, it is allowed to further reduce the size of the cylindrical structure 103 of the optical module component 100 from the centimeter range down to the millimeter range (dependent on the predefined cylinder diameter), so as to have an optical module component for the gas sensor with a reduced size having a dimension e.g., within a range below 10 mm in length (L) and in width (W), and within a range below 5 mm in height (H). It should be noted that the above mentioned dimensions of the optical module component according to the present disclosure are provided solely for purposes of example and are not intended to be construed as limiting. It is also allowed to reduce the size of the guiding reflector to minimize the overall size of the optical module component.

It should be further noted that the above mentioned structure of the optical module component and the above mentioned arrangement of the elements (i.e., the internal configuration) within the optical module component according to the present disclosure are provided solely for purposes of example and are not intended to be construed as limiting. For example, the cylindrical structure may be located at the upper/top part of the optical module component, and/or the optical filter may be located somewhere other than atop the detector. According to the present disclosure, various arrangement of the elements within the optical module component are possible and within the scope of the disclosure.

Figures 6, 7:
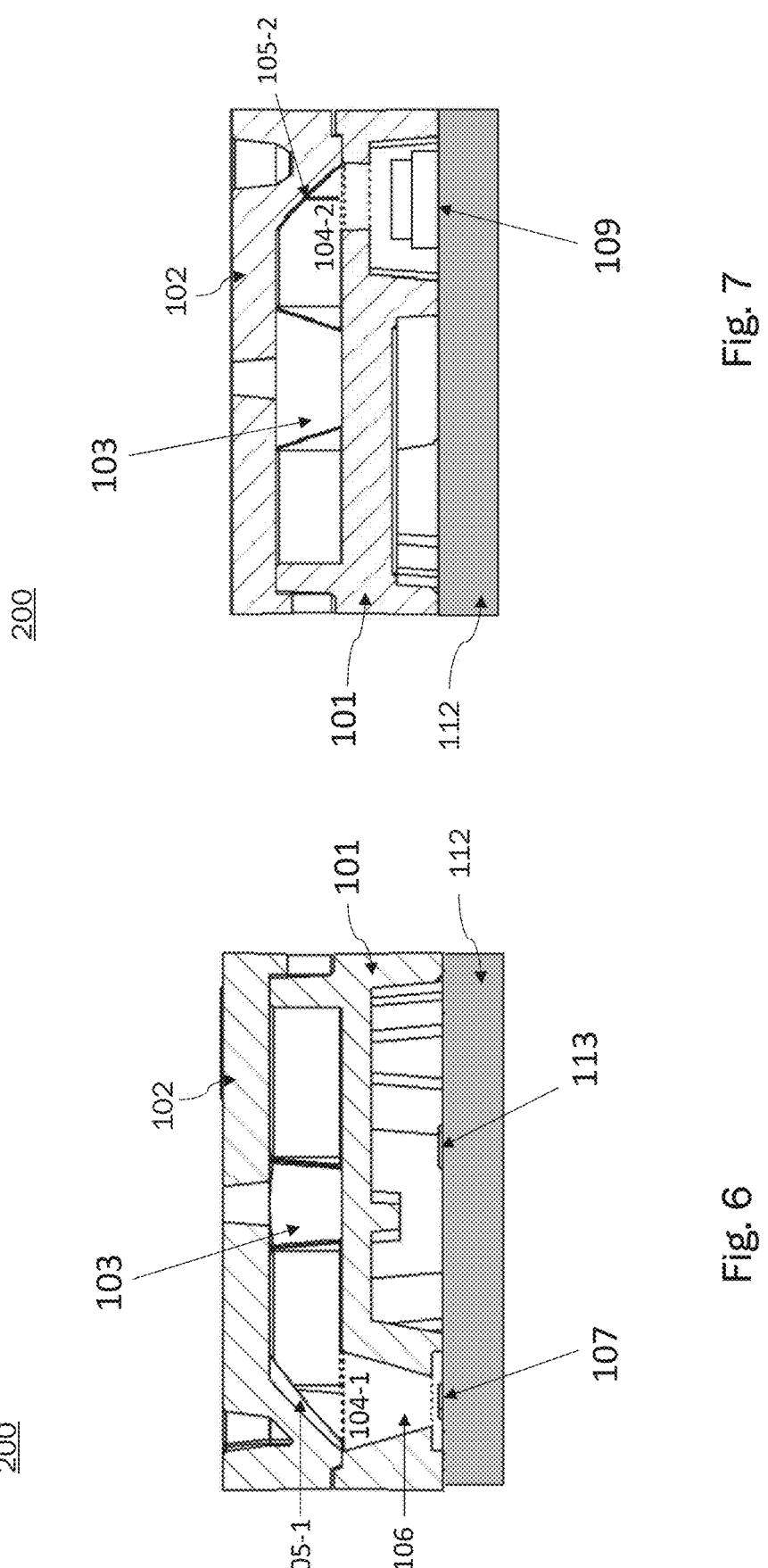

The optical module component as described in the foregoing embodiments may be attached (via e.g., clipping/gluing) to a printed circuit board (PCB) to provide a complete module/device for gas detection/measurement, as shown in FIGS. 6 and 7. FIG. 6 corresponds to FIG. 2, schematically illustrating a cross-sectional view of a gas sensor 200 comprising the above described optical module component 100 with a PCB arrangement 112 along A-A line indicated in FIG. 1 according to embodiments of the present disclosure. FIG. 7 corresponds to FIG. 4, schematically illustrating a cross-sectional view of a gas sensor 200 comprising the above described optical module component 100 with a PCB arrangement 112 along B-B line indicated in FIG. 1 according to embodiments of the present disclosure. The same reference numbers shown in FIGS. 6 and 7 as in FIGS. 1, 2 and 4 may represent the same or similar structure or components which will not herein be repeated for conciseness.

Figures 8A, 8B:
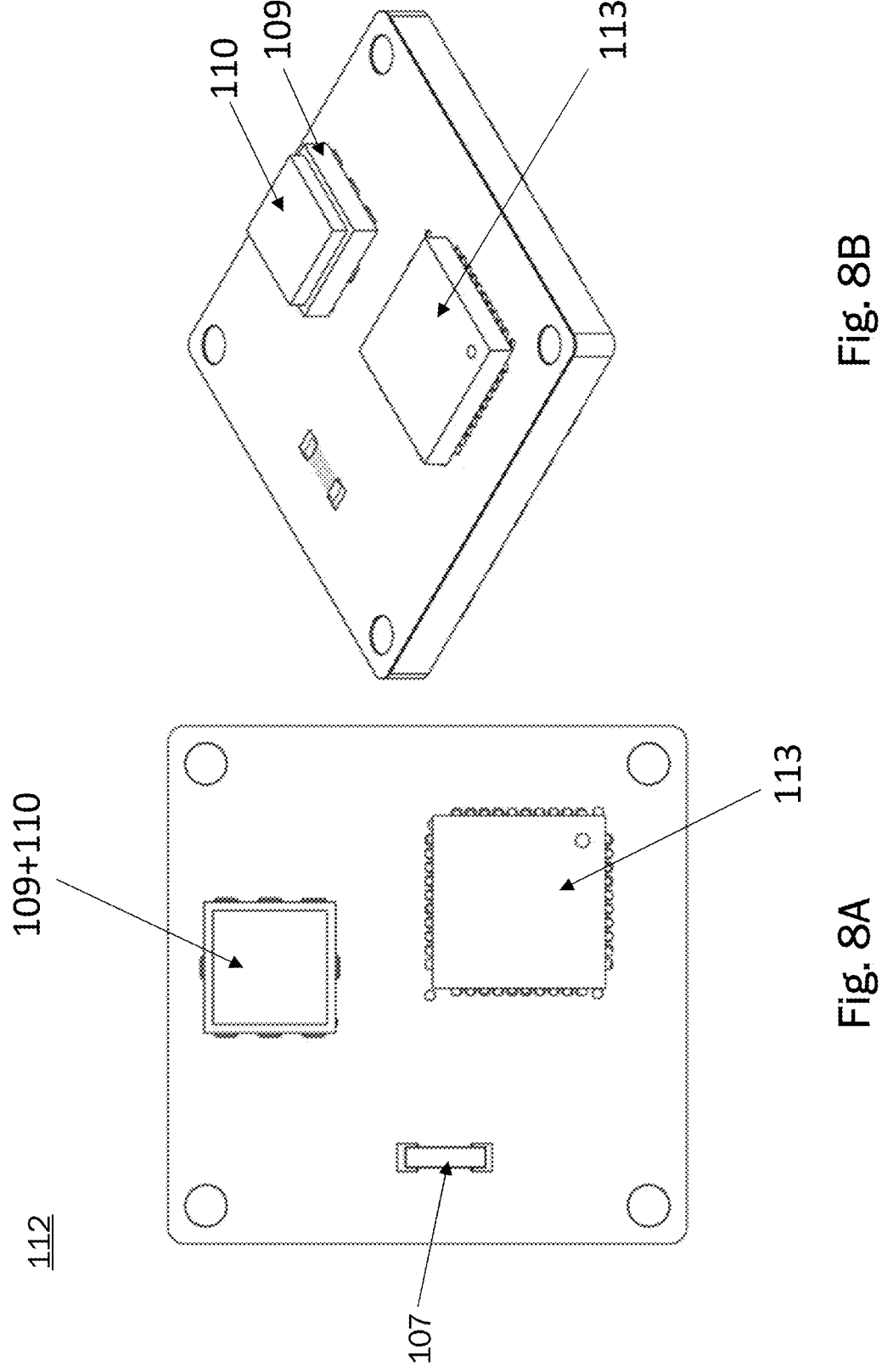

Particularly, the PCB arrangement 112 may be attached to the optical module component 100 via clipping or gluing and comprise a light source (e.g., the filament 107) configured to emit light for propagating in the optical cavity 103 of the optical module component 100 and an optical detector (e.g., the thermopile 109) configured to detect light from the optical cavity 103 of the optical module component 100. The PCB arrangement 112 may also comprise a controller (e.g., microcontroller) 113 configured to drive the light source 107 and to process an optical signal of the detected light. In some embodiments, the PCB arrangement 112 may further comprise an optical filter 110 arranged (e.g., atop the optical detector 109) to filter the light from the optical cavity 103 prior to reaching the detector 109. The PCB arrangement 112 itself may be implemented in a layer-stacked manner, as shown in FIG. 8. For instance, in the example of FIGS. 8A and 8B, the PCB arrangement 112 may be seen to comprise a respective layer of a light source 107, an optical detector 109, an optical filter 110 (optional), and a microcontroller 113 (optional). These layers may be copper layers, or of any other suitable material. As mentioned above, to achieve a more compact gas sensor device 200, the guiding reflector 106 of the optical module component 100 for coupling the light from the light source 107 into the optical cavity 103 may be arranged to be substantially close to the light source 107 on the PCB arrangement 112.

Accordingly, the gas sensor device 200 as proposed in the present disclosure may be provided by, for example, attaching an injection molded optical cavity structure (i.e., the optical module component 100) to the PCB arrangement 112 which may contain a filament as the optical source 107, a thermopile as the optical detector 109, and optionally a microcontroller 113 for controlling/driving the light source 107 and the optical detector 109. The PCB arrangement 112 may also contain an optical filter 110 disposed on the optical detector 109. In some specific applications, other additional components (e.g., a humidity sensor) may also be included to the PCB arrangement 112. It should be noted that the positions of the elements on the PCB arrangements (such as the light source 107, the optical detector 109, and optionally the microcontroller 113 and the optical filter 110) as illustrated in FIGS. 8A and 8B are merely for illustrative purposes and are not intended to be construed as limiting the scope of the disclosure. In particular, the optional microcontroller 113 may be placed at any position on the PCB, or at an optimal position on the PCB for the purpose of e.g., size minimization.

Figure 9B:
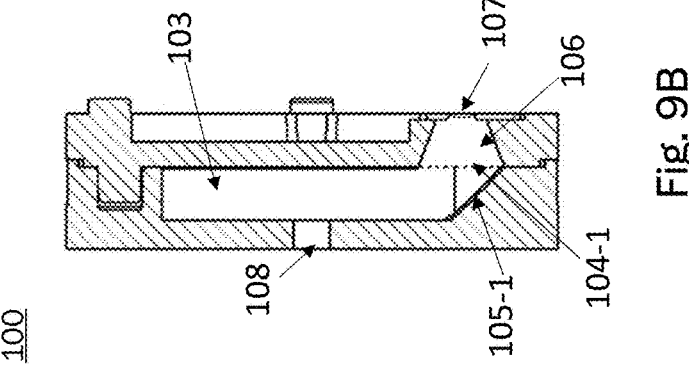
Figure 9A:
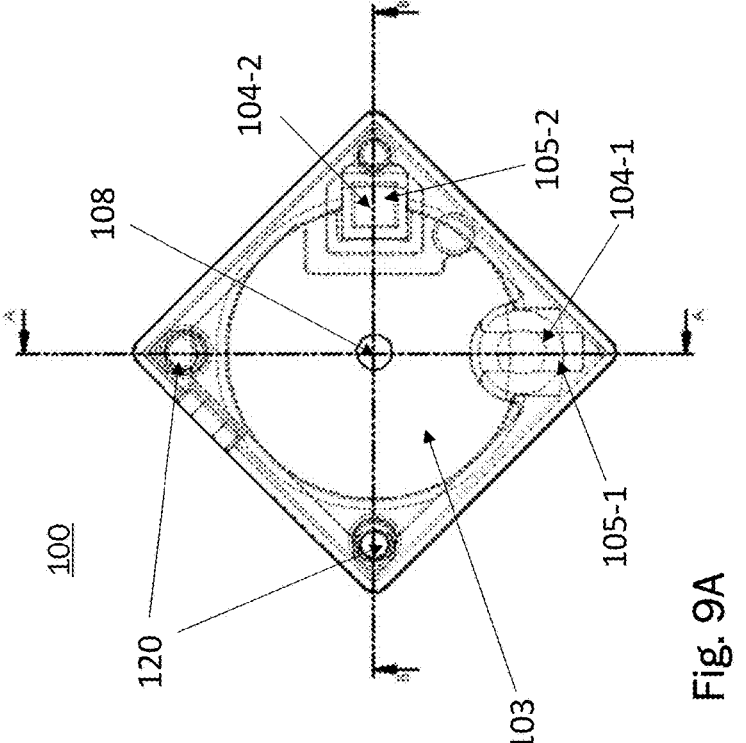
Figure 9C:
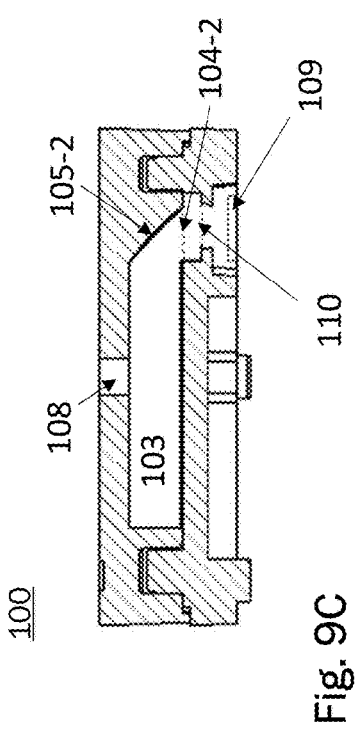
Figure 10A:
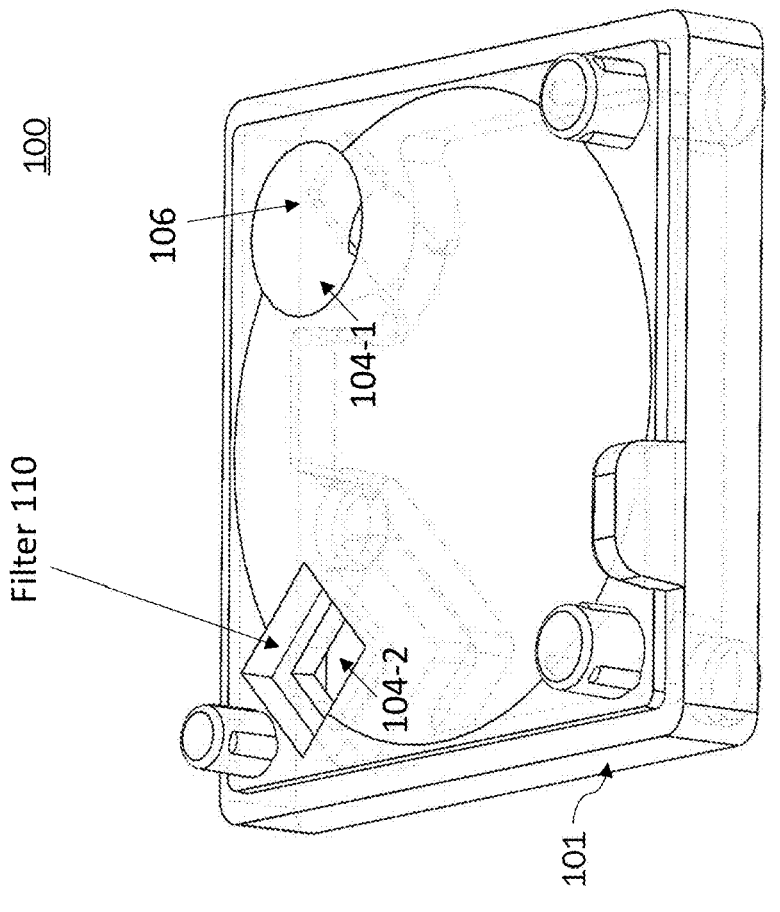
Figure 10B:
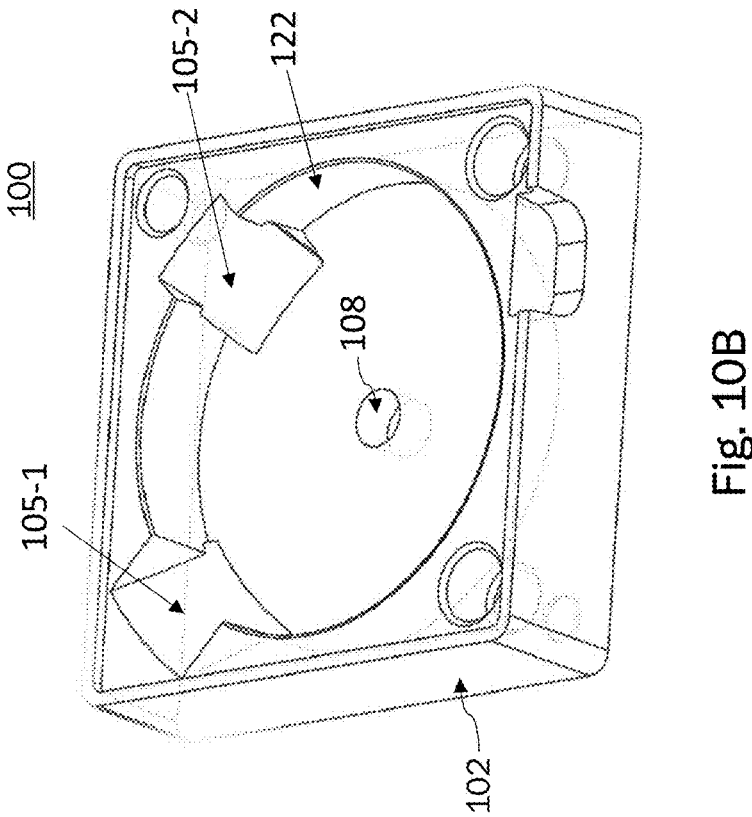
Figure 10C:
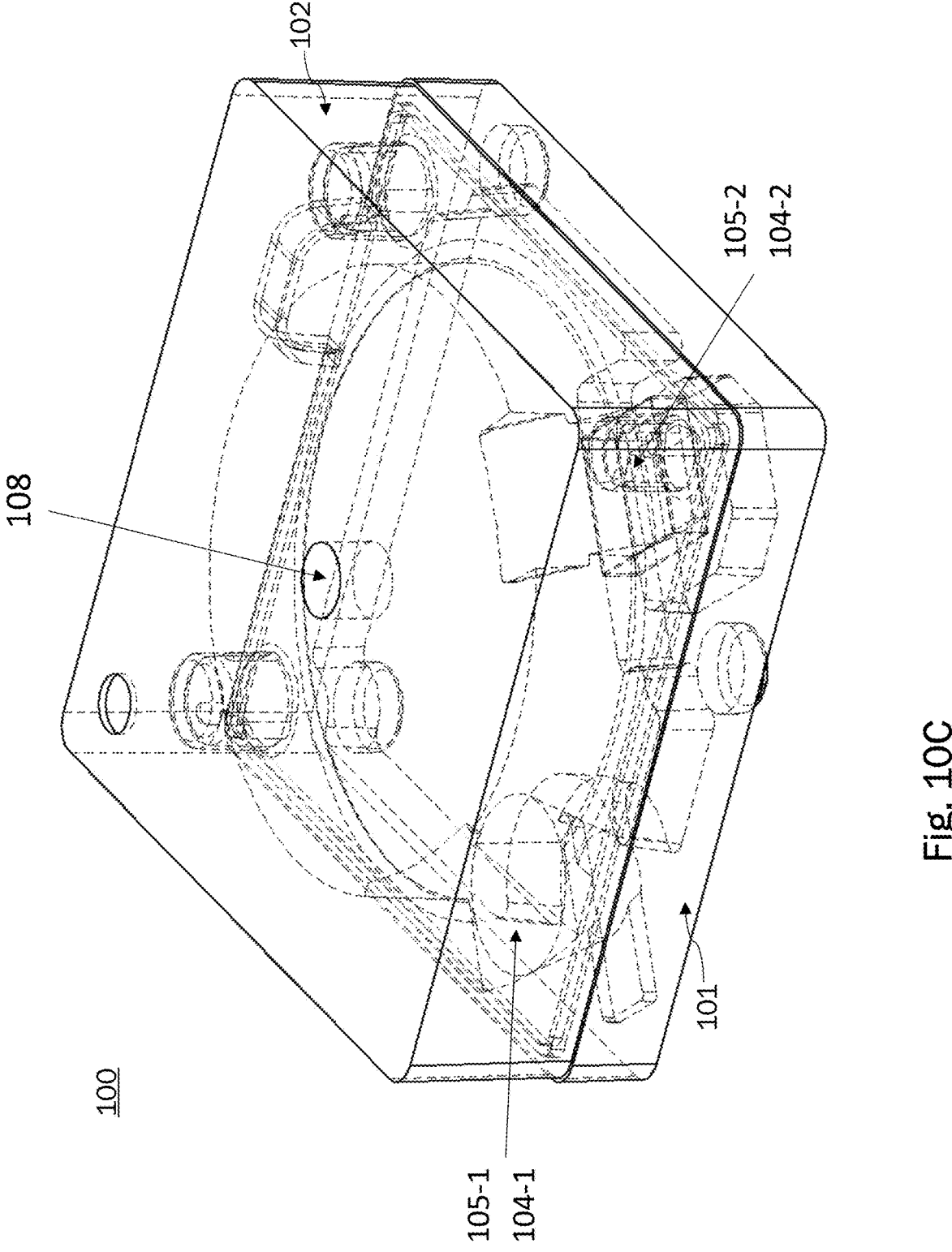
Figure 11:
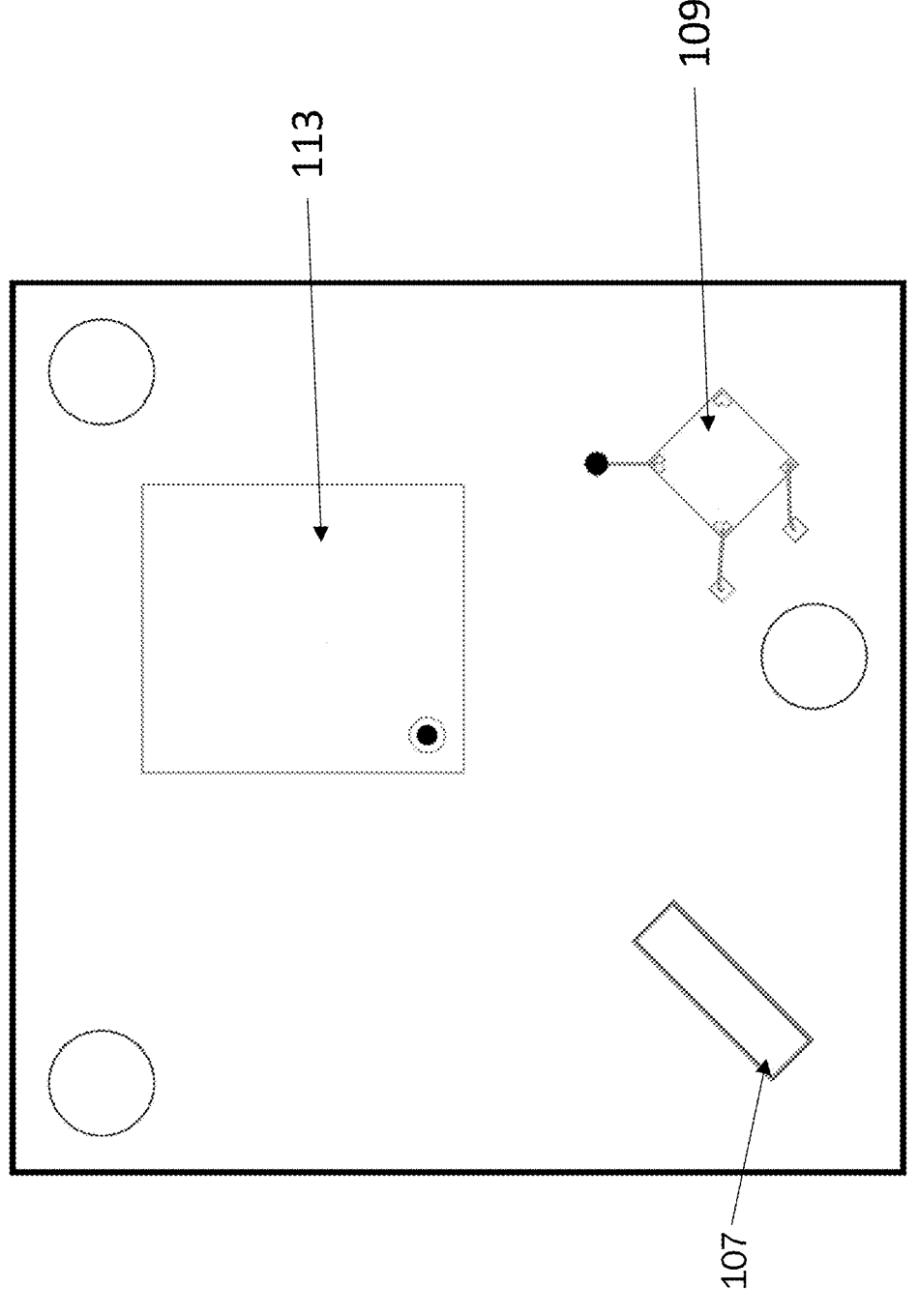

In some (other) embodiments, as illustrated in FIGS. 9 to 11, in order to decrease the dimensions of the cylindrical structure (e.g., diameter and height) and the guiding reflector dimension, the upper housing portion 102 may include the cylindrical structure 122 and the reflecting elements (105-1, 105-2), as shown in FIG. 10B, while the lower part 101 of the optical module may include the flat surface with the (two) openings (104-1, 104-2) and the guiding reflectors 106, as shown in FIG. 10A. Also, the optical filter 110 may optionally be placed in the opening 104-2 above the detector 109 within the first housing 101 to further reduce the size of the optical module component 100. It is also possible to place the optical filter plate on top of the guiding (cone) reflector.

It is appreciated that FIGS. 9 to 11 depict another exemplary aspect for implementing the optical module component and gas sensor according to the present disclosure. FIG. 9A to 9C may respectively correspond to FIGS. 1, 2 and 4, illustrating a top view and a respective side view of the optical module component according to a drawing along A-A line and B-B line as indicated the top view. Also, FIG. 10A to 10C may respectively correspond to FIGS. 3A to 3C, illustrating a three-dimensional (3D) view of the first housing portion 101, of the second housing portion 102, and of the first housing portion 101 affixed to the second housing portion 102 for the optical module component 100. Similarly, FIG. 11 may correspond to FIG. 8A illustrating the PCB arrangement 112 to be combined with the optical module component 100 for implementing the gas sensor 200. Notably, the embodiments shown in FIGS. 9 to 11 may have similar component/structure for the optical module component/gas sensor which may be represented by the same reference numbers and which will not herein be repeated for conciseness.

It is further appreciated that, compared to the embodiments of FIGS. 1 to 8, in the embodiments of FIGS. 9 to 11 the positions of the openings (104-1, 104-2) and the reflector 106 may be shifted from the middle of the module side to the corner(s) of module, so that more space can be provided for the reflector 106. Accordingly, the position of the thermopile (detector 109) and the filament (optical source 107) on the PCB may be changed so that they can be placed at optimal locations for guiding the light within the optical cavity (e.g., to be placed exactly under the respective openings 104-1, 104-2). Furthermore, in the embodiments of FIGS. 1 to 8, the position of the filter 110 is on the thermopile (i.e., on the PCB circuit board), while in the embodiments of FIGS. 9 to 11 the filter 110 is placed in the cut-out of the detector opening 104-2, as clearly shown in FIG. 9C and FIG. 10A.

The other optical components, such as the cone reflector 106 and the curved mirrors 105-1, 105-2, may have nearly the same size in all the embodiments. However, it is noted that the curved mirrors 105-1, 105-2 may be a portion of the top 102, and/or the cylindrical side wall 122 may be a portion of the top part 101 in the embodiments of FIGS. 9 to 11. Also, the cylindrical cavity 103 may have a smaller diameter and height in the embodiments of FIGS. 9 to 11 compared to the embodiments of FIGS. 1 to 8. With the arrangement as shown in the embodiments of FIGS. 9 to 11, the size of the optical module component for the gas sensor can be further reduced, e.g., down to 10 mm in length (L) and in width (W). Besides, as mentioned above, the recess portions 111-1, 111-2 are optional and may not necessarily be present as in the example of FIG. 10C.

It should be noted that the above mentioned structure of the optical module component and the above mentioned arrangement of the elements within the optical module component, as well as the positions of the elements on the PCB arrangements as illustrated in FIGS. 1 to 11 are merely for illustrative purposes and are not intended to be construed as limiting the scope of the disclosure.

FIG. 5 schematically shows a flowchart illustrating an example of a method 500 for manufacturing an optical module component for a gas sensor according to embodiments of the present disclosure. The optical module component may be implemented as the optical module component 100 in FIGS. 9 to 10, FIGS. 1 to 4, or the like, for example. In some embodiments, the method 500 may be implemented by means of injection molding, as would be appreciated by one of ordinary skill in the art. Alternatively, one of ordinary skill in the art would also be able to use other ways apart from injection molding to manufacture the internal configuration/structure of the optical module component, and the present disclosure shall not limit the implementation of the method 500 to any specific manufacturing technique.

In particular, method 500 may comprise, at step S510, providing a first housing portion 101 of the optical module component 100. Method 500 may further comprise, at step S520, providing a second housing portion 102 of the optical module component 100. Here, according to one of embodiments, step S520 is performed after step 510 as shown in FIG. 5. However, step 520 may be performed before step S510, or may be performed at the same time as step S510. Also, the first housing portion 101 provided in step S510 has the first opening 104-1 for receiving light from the light source 107 and at least one second opening 104-2 for passing light from the optical cavity to the detector 109. According to one of embodiments, the first housing portion 101 having the first and second openings 104-1, 104-2 is formed by injecting a material, such as a polymer typed resin, into a molding die, and by cooling the material with a pressure. That is, the first housing portion 101 and the first and second openings 104-1, 104-2 are formed in one step. However, the first housing portion 101 and the first and second openings 104-1, 104-2 may be formed in different steps, or at different times. That is, the first opening 104-1 and the second opening 104-2 may be formed in the first housing portion 101 after providing the first housing portion 101. Also, the second housing portion 102 provided in step S520 has the first curved mirror and the second curved mirror. According to one of embodiments, like the first housing portion 101, the second housing portion 102 having the first and second curved mirrors is formed by injecting a material, such as a polymer typed resin, into a molding die, and by cooling the material with a pressure. That is, the second housing portion 102 and the first and second curved mirrors are formed in one step. However, the second housing portion 102 and the first and second curved mirrors may be formed in different steps, or at different times. That is, the first and second curved mirrors may be formed in the second housing portion 102 after providing the second housing portion 102.

In particular, an optical axis of each of the first and second curved reflecting elements (namely, the first and second curved mirrors) may be tilted with respect to a diametral plane of the optical cavity. As indicated above, the manufacturing of those elements/portions of the optical module component 100 may be conducted by, e.g., injection molding or other suitable techniques that can form the internal configuration/structure of the optical module component as proposed by the present disclosure.

Method 500 may yet further comprise, at step S530, providing a reflective coating layer on the surface of the first housing portion 101 of the optical module component 100. Method 500 may further comprise, at step S540, providing a reflective coating layer on the surface of the second housing portion 102 of the optical module component 100. According to one of embodiments, at step S530, the reflective coating layer is formed on the surface of the first housing portion 101 including an inside of each of the first and second openings 104-1, 104-2, after releasing the first housing portion 101 from the molding die. Also, at step S540, the reflective coating layer is formed on the surface of the second housing portion 102 including a surface of each of the first and second curved mirrors, after releasing the second housing portion 102 from the molding die in one of embodiments. By performing this step S540, the first curved mirror coated with the optically reflective material is formed as the first curved reflecting element 105-1 for directing the light from the light source 107 into the optical cavity. Also, by this step S540, the second curved mirror coated with the optically reflective material is formed as the second curved reflecting element 105-2 for directing the light from the optical cavity to the detector 109. Here, according to one of embodiments, step S540 is performed after step 530 as shown in FIG. 5. However, step 540 may be performed before step S530, or may be performed at the same time as step S530.

Method 500 may yet further comprise, at step S550, placing the optical filter 110 in the second opening 104-2, which is located above the detector 109, within the first housing portion 101, as shown in FIG. 9C. Here, the optical filter 110 may be placed on the detector 109 as shown in FIG. 4. In that case, this step S550 can be skipped.

Method 500 may yet further comprise, at step S560, joining the first housing portion 101 to the second housing portion 102. By joining the first housing portion 101 and the second housing portion 102 to each other, a substantially cylindrical optical cavity is formed. Particularly, a lower inner surface of the optical cavity may be formed by the first housing portion 101 and an upper inner surface of the optical cavity may be formed by the second housing portion 102.

Configured as above, the optical module component with an optical molding structure, the gas sensor and the method for manufacturing the optical module component according to the present disclosure provides an efficient way to improve the coupling efficiency of the light source into the optical cavity and therefore to maximize the light absorption of the gas, while keeping the light source relatively far away from the optical cavity.

By arranging the openings and the curved reflecting elements at appropriate positions (e.g., with a predefined angle relative to each other), single-channel as well as multi-channel gas sensing may be achieved in a precise and efficient manner. In particular, the light propagating path inside the cavity can be increased, thereby enhancing the light absorption by the gas.

Accordingly, a compact NDIR gas sensor module may also be provided to detect a predetermined gas of interest using a compact optical cavity structure. By Integrating miniaturized optical components into the optical body, an efficient gas sensing approach may be provided to improve detection performance while maintaining the enclosure in a very compact size.

It should be noted that the apparatus features described above correspond to respective method features that may however not be explicitly described, for reasons of conciseness. The disclosure of the present document is considered to extend also to such method features. In particular, the present disclosure is understood to relate to methods of manufacturing the optical module component described above, and/or to providing and/or arranging respective elements of the optical module component.

It is to be further noted that examples of embodiments of the disclosure are applicable to various system configurations, depending on the underlining technical fields. In other words, the examples shown in the above-described figures, which are used as a basis for the above discussed examples, are only illustrative and do not limit the present disclosure in any way. That is, additional further existing and proposed new functionalities available in a corresponding operating environment may be used in connection with examples of embodiments of the present disclosure based on the principles defined.

It should also be noted that the disclosed example embodiments can be implemented in many ways using hardware and/or software configurations. For example, the disclosed embodiments may be implemented using dedicated hardware, dedicated software, and/or hardware in association with software executable thereon. The components and/or elements in the figures are examples only and do not limit the scope of use or functionality of any hardware, software in combination with hardware, firmware, embedded logic component, or a combination of two or more such components implementing particular embodiments of the present disclosure.

Finally, it should be noted that the description and drawings merely illustrate the principles of the proposed apparatuses and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed apparatus and method. Furthermore, all statements herein providing principles, aspects, and embodiments of the invention, as well as specific examples thereof, are intended to encompass equivalents thereof.

The invention claimed is:

1. An optical module component for a gas sensor, comprising:
    a first housing portion; and
    a second housing portion,
    wherein the first housing portion and the second housing portion are configured to be joined together and to form a substantially cylindrical optical cavity when joined together,
    wherein a lower inner surface of the optical cavity is formed by the first housing portion and an upper inner surface of the optical cavity is formed by the second housing portion,
    wherein the optical module component further comprises:
        a first opening for receiving light from a light source;
        at least one second opening for passing light from the optical cavity to a detector;
        a first mirror that directs the light from the light source into at least one wall inside the optical cavity; and
        a second mirror that directs the light from the at least one wall inside the optical cavity to the detector,
    wherein optical axes of the first and second mirrors are tilted with respect to a diametral plane of the optical cavity, and
    wherein the first housing portion comprises a guiding reflector for reflecting the light from the light source to the first mirror via an inner surface of the guiding reflector, wherein the guiding reflector has a truncated cone shape with a smaller diameter part pointing towards the light source to cause reflection of the light to reflect off the inner surface of the guiding reflector before reaching the optical cavity.

2. The optical module component according to claim 1, wherein the first housing portion comprises a flat surface, wherein the second housing portion comprises:
    a cylindrical structure; and
    the first and second mirrors,
    wherein the flat surface of the first housing portion is positioned to be joined to a peripheral wall of the cylindrical structure of the second housing portion, and
    wherein the first opening and the second opening are disposed at the flat surface of the first housing portion.

3. The optical module component according to claim 1, wherein the first housing portion comprises a cylindrical structure,
    wherein the second housing portion comprises a flat surface,
    wherein the flat surface of the second housing portion is positioned to be joined to a peripheral wall of the cylindrical structure of the first housing portion, and
    wherein the first opening and the second opening are disposed in the cylindrical structure of the first housing portion.

4. The optical module component according to claim 1, wherein the first and second mirrors are arranged outside of a circumferential inner surface portion of the optical cavity,
    wherein the first mirror is further arranged to direct light originating from a first location below the lower inner surface of the optical cavity into the optical cavity, and wherein the second mirror is further arranged to direct the light from the optical cavity to a second location below the lower inner surface of the optical cavity.

5. The optical module component according to claim 1, wherein the first and second openings are horizontal openings located on the lower inner surface of the optical cavity, and wherein the first mirror extends from the upper inner surface of the optical cavity towards the first opening and the second mirror extends from the upper inner surface of the optical cavity towards the at least one second opening.

6. The optical module component according to claim 1, wherein the first mirror and the second mirror are arranged as a respective extending part of the second housing portion, or in part of the respective extending part, and disposed according to a position of the first opening and a position of the second opening, respectively, such that the light is directed by the first mirror from the light source into the optical cavity through the first opening and is directed by the second mirror from the optical cavity to the detector through the at least one second opening.

7. The optical module component according to claim 6, wherein the respective extending part of the second housing portion has an inclined surface on which the respective first and second mirrors are is formed, the inclined surfaces being positioned corresponding to the position of the first opening and the position of the second opening, respectively.

8. The optical module component according to claim 1, wherein the first housing portion and the second housing portion are formed by means of injection molding.

9. The optical module component according to claim 1, wherein inner surfaces of the optical cavity are coated with optically reflective material.

10. The optical module component according to claim 1, wherein the first mirror and the second mirror each comprises a respective curved mirror coated with optically reflective material.

11. The optical module component according to claim 1, further comprising an optical filter arranged to filter the light from the optical cavity prior to reaching the detector.

12. The optical module component according to claim 11, wherein the optical filter is disposed in the at least one second opening and/or on top of the guiding reflector.

13. The optical module component according to claim 1, wherein the first opening and the second opening are positioned relative to each other at 90 degrees azimuthal angle in the diameter plane of the optical cavity.

14. The optical module component according to claim 1, further comprising one or more further second openings together with a respective optical filter disposed at predefined angular locations in the first housing portion, the one or more respective optical filters arranged to filter the light from the optical cavity, the optical module component further comprising one or more further second curved reflecting elements associated with the one or more further second openings and arranged to direct the light of a respective wavelength of the light source from the optical cavity to a respective detector through the respective further second opening with the respective optical filter.

15. The optical module component according to claim 1, further comprising at least one gas port for serving as a gas inlet to and/or gas outlet from the optical cavity, wherein the at least one gas port is disposed on the lower inner surface or the upper inner surface of the optical cavity.

16. A gas sensor comprising:

the optical module component having an optical cavity according to claim 1;

a printed circuit board, PCB, arrangement attached to the optical module component and comprising:

the light source, wherein the light source comprises a filament that emits light for propagating in the optical cavity of the optical module component; and an optical detector configured to detect light from the optical cavity of the optical module component.

17. The gas sensor according to claim 16, wherein the guiding reflector and the first mirror are arranged to be substantially close to the light source.

18. The gas sensor according to claim 16, wherein an arrangement of the PCB further comprises a controller configured to drive the light source and to process an optical signal of the detected light.

* * * * *